(12) United States Patent
Petrelli

(10) Patent No.: US 11,052,577 B2
(45) Date of Patent: Jul. 6, 2021

(54) OVEN FOR CLEANING MOLDS, DIE NOZZLES AND COMPONENTS FOR APPARATUSES FOR PROCESSING PLASTIC MATERIALS IN GENERAL

(71) Applicant: Patrizio Petrelli, Varese (IT)

(72) Inventor: Patrizio Petrelli, Varese (IT)

( * ) Notice: Subject to any disclaimer, the term of this patent is extended or adjusted under 35 U.S.C. 154(b) by 8 days.

(21) Appl. No.: 15/678,673

(22) Filed: Aug. 16, 2017

(65) Prior Publication Data
US 2018/0056550 A1 Mar. 1, 2018

(30) Foreign Application Priority Data
Aug. 26, 2016 (IT) .......... 102016000087451

(51) Int. Cl.
*B29C 33/72* (2006.01)
*C21D 9/00* (2006.01)
*B08B 7/00* (2006.01)

(52) U.S. Cl.
CPC .......... *B29C 33/72* (2013.01); *B08B 7/0071* (2013.01); *C21D 9/005* (2013.01); *C21D 9/0056* (2013.01)

(58) Field of Classification Search
None
See application file for complete search history.

(56) References Cited

U.S. PATENT DOCUMENTS

| 1,739,958 | A | | 12/1928 | Farmer | |
|---|---|---|---|---|---|
| 2,869,856 | A | | 1/1959 | Greene | |
| 3,227,798 | A | | 1/1966 | Delange et al. | |
| 3,315,513 | A | * | 4/1967 | Ellenburg | B21D 51/08 72/342.4 |
| 9,441,886 | B2 | * | 9/2016 | Moller | C21D 9/0018 |
| 2004/0000327 | A1 | * | 1/2004 | Somboli | B08B 3/02 134/21 |
| 2016/0069613 | A1 | * | 3/2016 | Colgan | H01L 21/67109 438/795 |

FOREIGN PATENT DOCUMENTS

| CN | 202786396 | * | 3/2013 | .............. C23C 8/36 |
|---|---|---|---|---|
| CN | 105773911 A | | 7/2016 | |
| EP | 1 127 555 A1 | | 8/2001 | |

OTHER PUBLICATIONS

CN202786396 English Translation, accessed on April. (Year: 2013).*
European Search Report dated Nov. 20, 2017 received in European Patent Application No. 17 18 4971.

* cited by examiner

*Primary Examiner* — Eric W Golightly
*Assistant Examiner* — Arlyn I Rivera-Cordero
(74) *Attorney, Agent, or Firm* — Scully, Scott, Murphy & Presser, P.C.

(57) ABSTRACT

An oven for cleaning molds, die nozzles and components for apparatuses for processing plastic materials in general, comprising a basket adapted to contain the molds to be cleaned, and a heating bell adapted to heat the molds contained in the basket, the bell can be moved away and upward with respect to the die-carrying basket in order to facilitate access to the die-carrying basket.

5 Claims, 4 Drawing Sheets

OVEN FOR CLEANING MOLDS, DIE NOZZLES AND COMPONENTS FOR APPARATUSES FOR PROCESSING PLASTIC MATERIALS IN GENERAL

CROSS-REFERENCE TO RELATED APPLICATIONS

This Application claims priority to Application IT 102016000087451 filed on Aug. 26, 2016.

BACKGROUND OF THE DISCLOSURE

The present invention relates to an oven for cleaning molds, die nozzles and components for apparatuses for processing plastic materials in general.

As is known, for cleaning molds used for processing plastic materials, or die nozzles and the like, ovens are used which make it possible to heat the mold, thus removing the residues of plastic material, in order to then collect the above mentioned residues in a container in a position below the mold.

Conventional ovens entail the use of a heating bell which is arranged in position above a basket containing the molds to be treated.

The drawback of such solution consists in that the loading/unloading of the molds into/from the basket is obstructed by the presence of the bell and further the sealing gaskets between the bell and the basket are arranged in the hottest region of the oven and therefore are subject to wear and need to be replaced frequently.

Furthermore, in conventional ovens, there is the risk of spontaneous combustion of the plastic polymer present in the mold and there is also the formation of carbonaceous deposits, with the drawback of making the step of cleaning the mold at the end of the cleaning cycle difficult.

Furthermore, during the cleaning of the molds, the polymer is heated and collected in a trade underneath the mold-carrying basket and during this step harmful gases are generated which must be suitably treated in order to neutralize them.

For this reason extractor hoods and/or filtering devices are provided, if the oven is to be used in enclosed environments.

BRIEF SUMMARY OF THE DISCLOSURE

The aim of the present invention is to provide an oven for cleaning molds, die nozzles and components for apparatuses for processing plastic materials in general, which makes it possible to facilitate the operation of loading/unloading molds into/from the die-carrying basket.

Within this aim, an object of the present invention is to provide an oven for cleaning molds, die nozzles and components for apparatuses for processing plastic materials in general, in which the heating of the molds being subjected to treatment is done rapidly and evenly, thus saving energy with respect to conventional ovens.

Another object of the present invention is to provide an oven for cleaning molds, die nozzles and components for apparatuses for processing plastic materials in general, in which the generation of harmful gases is reduced to the minimum possible and the oven can be used in enclosed environments without the need to install extractor hoods and/or filtering devices.

Another object of the present invention is to provide an oven for cleaning molds, die nozzles and components for apparatuses for processing plastic materials in general, that is highly reliable, easily and practically implemented and low cost.

This aim and these and other objects which will become better apparent hereinafter are achieved by an oven for cleaning molds, die nozzles and components for apparatuses for processing plastic materials in general, which comprises a basket adapted to contain the molds to be cleaned, and a heating bell adapted to heat the molds contained in said basket, characterized in that the bell can be moved away and upward with respect to said die-carrying basket in order to facilitate access to said die-carrying basket.

BRIEF DESCRIPTION OF THE SEVERAL VIEWS OF THE DRAWINGS

Further characteristics and advantages of the invention will become better apparent from the detailed description of a preferred, but not exclusive, embodiment of the oven according to the invention, which is illustrated by way of non-limiting example in the accompanying drawings, wherein.

DETAILED DESCRIPTION OF THE DISCLOSURE

Figure 1:
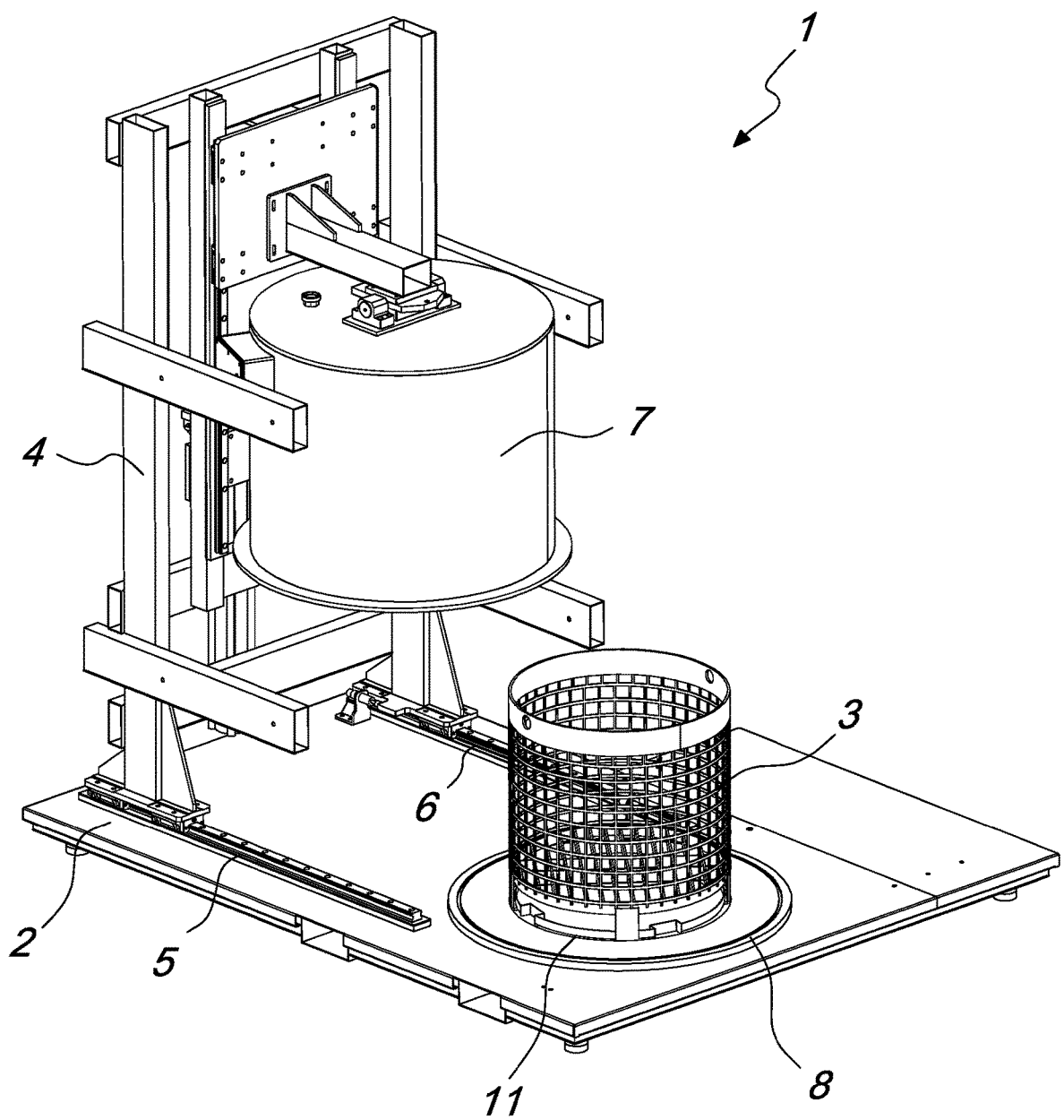
FIG. 1 is a perspective view of the oven according to the invention, in configuration of loading the molds and in the open condition.

With reference to the figures, the oven according to the invention, generally designated by the reference numeral 1, comprises a base frame 2 that is adapted to accommodate a basket 3 that is in turn adapted to contain molds to be subjected to a cycle of cleaning.

Figure 2:
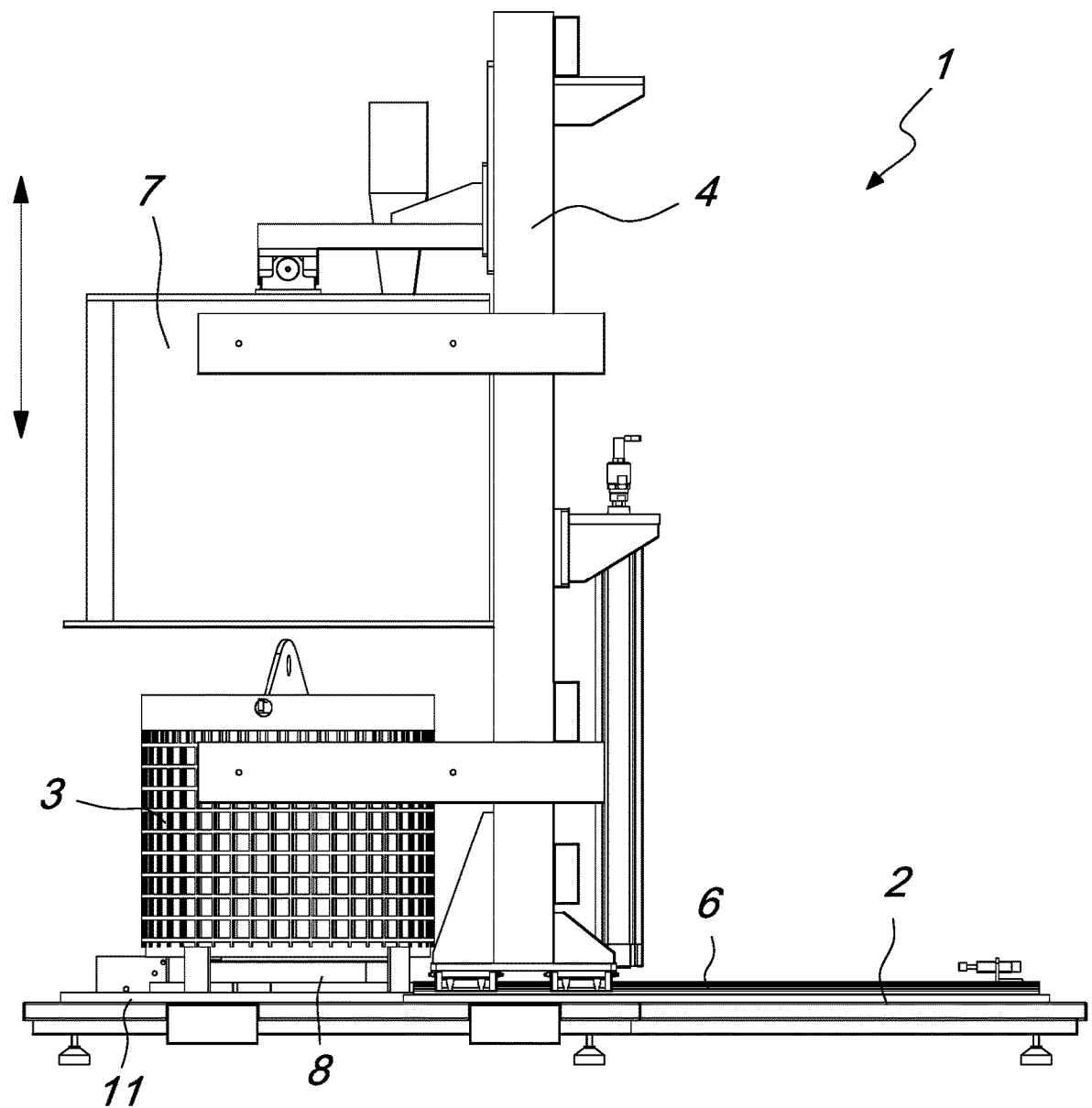
FIG. 2 is a side view of the oven according to the invention, in the condition of placing the heating bell above the die-carrying basket.
Figure 3:
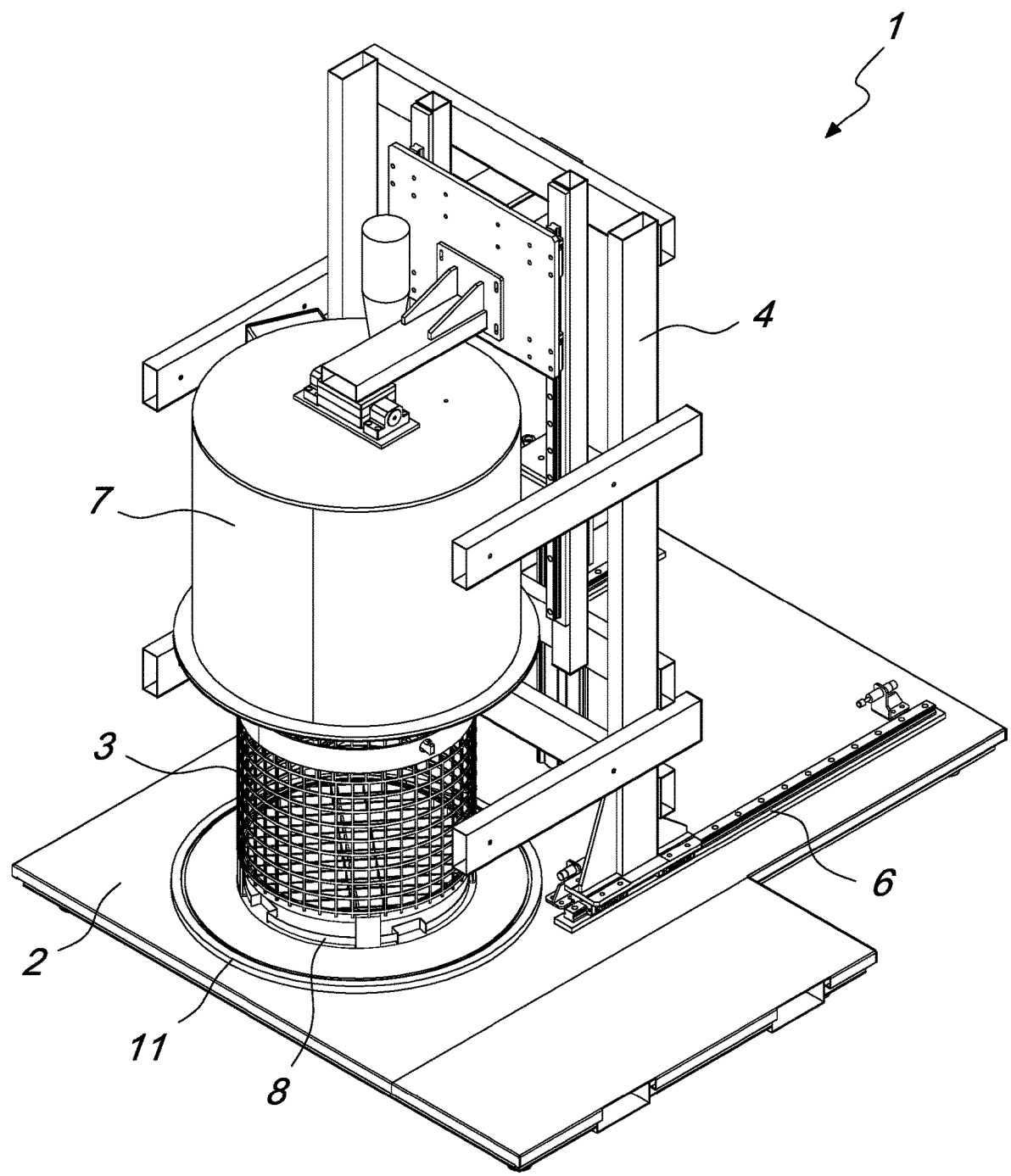
FIG. 3 is a perspective view of the oven shown in the configuration of FIG. 2.

The base frame 2 has a supporting framework 4 that is adapted to support, so that it can move along a pair of side rails 5 and 6, a heating bell 7 that is adapted to pass from the inactive configuration, as illustrated in FIG. 1, in which the bell is misaligned with respect to the die-carrying basket 3, to an operative condition in which the bell is axially aligned with the die-carrying basket 3, as shown in FIGS. 2 and 3.

The bell 7 can therefore be moved toward the basket 3 along the rails 5 and 6, by moving the supporting framework 4, and it can be moved vertically along its own axis, in order to pass from an inactive condition in which the bell 7 is raised with respect to the mold-carrying basket 3, as shown in FIGS. 2 and 3, to an operative condition in which the bell 7 is lowered around the basket 3 and in this case the seal is ensured by gaskets 8 arranged on the base frame 2.

Figure 4:
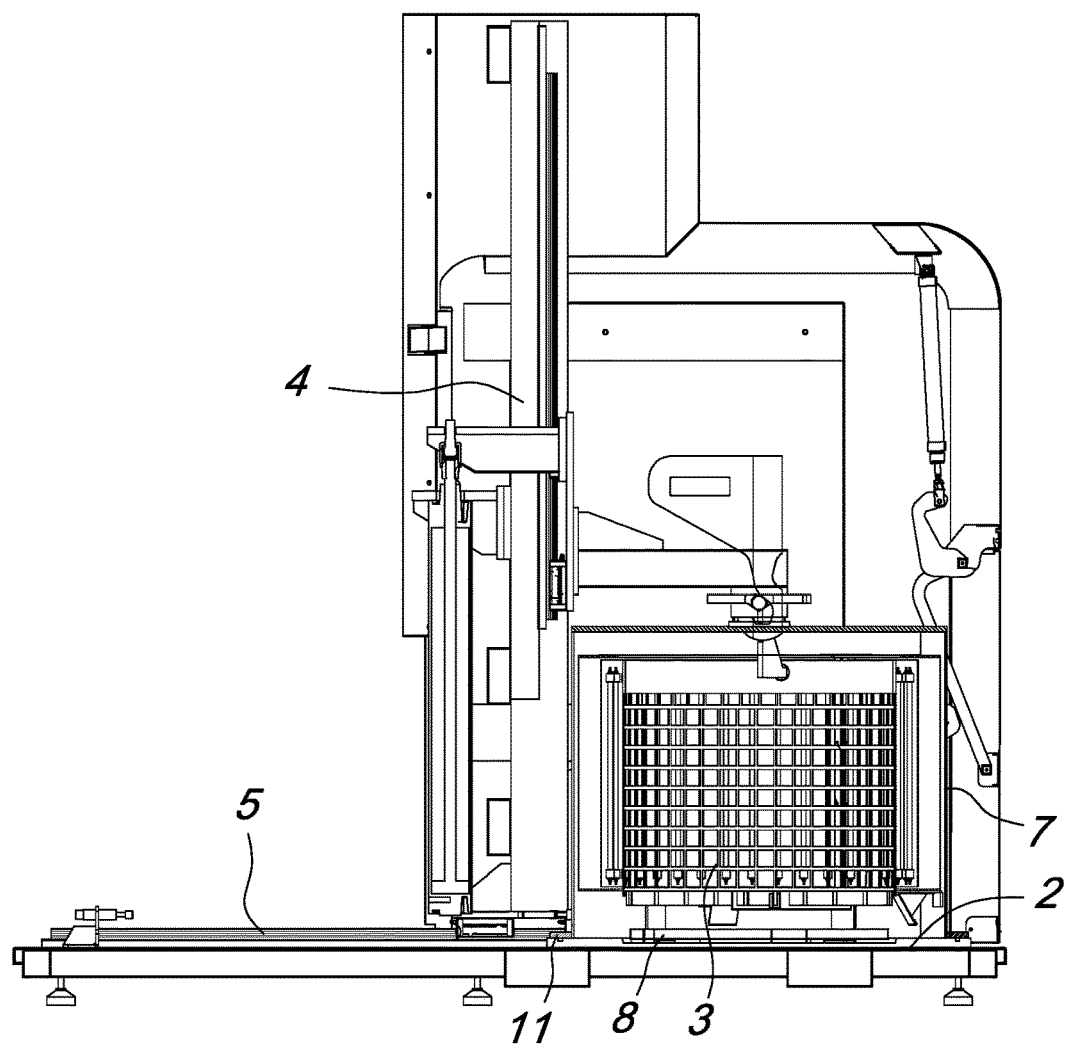
FIG. 4 is a cutaway view of the oven according to the invention in the closed condition.

The operative condition of the oven is shown in the cutaway view in FIG. 4.

The gaskets 8, arranged on the base frame 2, make it possible to hermetically seal the coupling between the heating bell 7 and the base frame 2, with the advantage that the gaskets 8 are in the coolest part of the oven given that the bell at the end of the cycle is raised and moved back, thus freeing the basket 3 and the gaskets 8.

Figure 5:
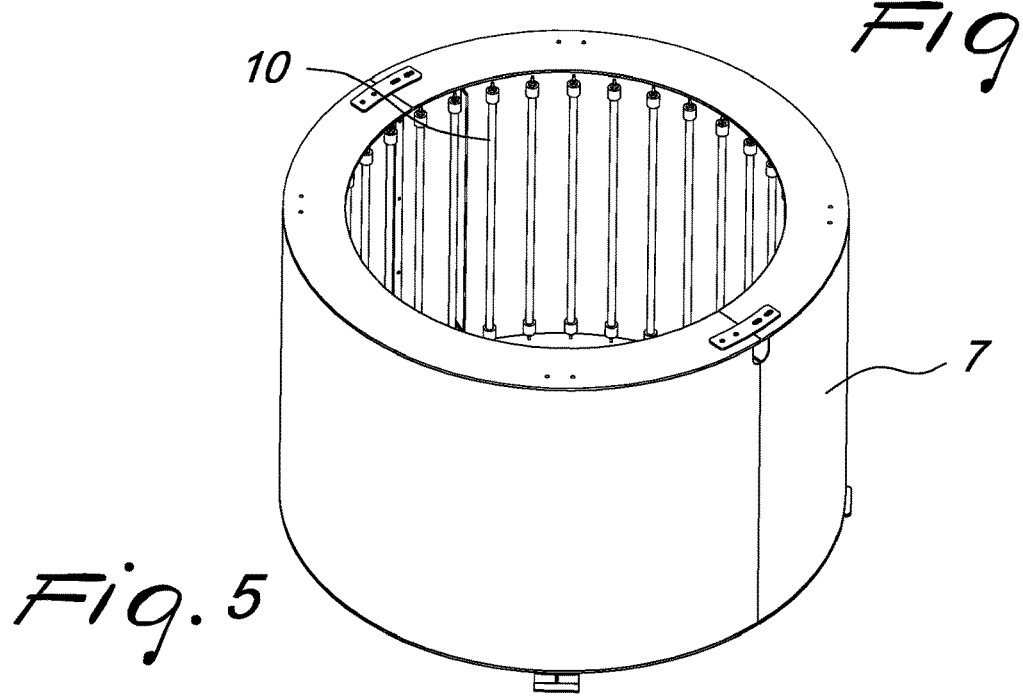
FIG. 5 is a perspective view of a detail of the heating bell of the oven according to the invention.

The bell 7, as shown in FIG. 5, is provided with at least one heating device that uses electromagnetic waves with an emissivity frequency in the infrared range. This ensures that the process of heating the molds subjected to the cleaning treatment is rapid and even. In this manner it is possible to obtain a considerable energy saving with respect to conventional ovens.

The reference numeral 10 designates infrared lamps arranged on the inner surface of the circular bell 7, which constitute the heating devices mentioned above.

The oven is further provided with a nitrogen generator which makes it possible to execute the cleaning process in an inert environment. The method therefore requires that the triggering of the heating cycle and the introduction of nitrogen happen simultaneously and, more precisely, the inertization is ensured with the introduction of a volume at least three times that of the internal volume of the oven.

The fact of removing the oxygen from the inner environment of the oven in favor of the nitrogen which is introduced guards against the risk of spontaneous combustion of the polymer that is present in the molds to be cleaned and prevents the formation of carbonaceous deposits. This makes the step of cleaning the mold at the end of the cycle considerably easier.

The use of nitrogen further makes it possible to cool, and therefore re-solidify, the polymer that is collected in a tray 11 underneath the die-carrying basket 3. The re-solidification of the polymer also means the interruption of the generation of harmful gases, with the considerable advantage of having a reduced quantity of fumes to be treated.

A suitable catalyst for treating the plastic polymers neutralizes the exhaust gases that are produced in the transition of the polymer from the solid state to the liquid state. In this manner it is possible to use the oven in enclosed environments without it being necessary to install extractor hoods and/or filtering devices.

The oven is further provided with a PLC that manages all its functions. The operator therefore has a control panel with a touchscreen which is programmed to start a specific cleaning cycle for each type of polymer that can be treated with the process and which is provided by way of the oven according to the invention.

In practice it has been found that the oven according to the invention fully achieves the set aim and objects, since it makes it possible to facilitate the operation of loading and/or unloading molds into/from the die-carrying basket by virtue of the fact that the heating bell can be moved away from the die-carrying basket, and further it makes it possible to reduce the harmful fumes to be treated and it does not require the use of extractor hoods and/or filtering devices if the oven should be used in enclosed environments.

The oven, thus conceived, is susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The disclosures in Italian Patent Application No. 102016000087451 (UA2016A006227) from which this application claims priority are incorporated herein by reference.

The invention claimed is:

1. An oven for cleaning molds, die nozzles and components for apparatuses for processing plastic materials, comprising:
a basket adapted to contain the molds to be cleaned, and
a heating bell adapted to heat the molds contained in said basket, wherein the bell can be moved away and upward with respect to said basket in order to facilitate access to said basket, wherein said bell is configured to move along a pair of rails arranged on a base frame of said oven, said base frame supporting said basket, wherein the heating bell comprises a plurality of infrared lamps, each of said plurality of lamps having a first end and a second end, wherein the first end is nearer an upper surface of the heating bell than the second end, and wherein the second end is nearer a lower surface of the heating bell than the first end, and wherein the heating bell comprises a hollow cylinder having a first opening in the upper surface and a second opening in the lower surface and wherein the plurality of infrared lamps are spaced apart from one another around an interior surface of the hollow cylinder.

2. The oven according to claim 1, wherein said bell can move vertically along its own axis, along a supporting framework that is arranged so that it can move along the pair of rails on said base frame.

3. The oven according to claim 1, further comprising a tray on said base frame, wherein said tray extends around the circumference of said basket, between said base frame and said basket.

4. The oven according to claim 1, wherein said bell is adapted to be arranged on said basket and to rest on the base frame in order to provide a seal around said basket, with the interposition of gaskets.

5. The oven according to claim 4, wherein said gaskets are configured to form a hermetic seal between said heating bell and said base frame.

* * * * *